Patented June 20, 1950

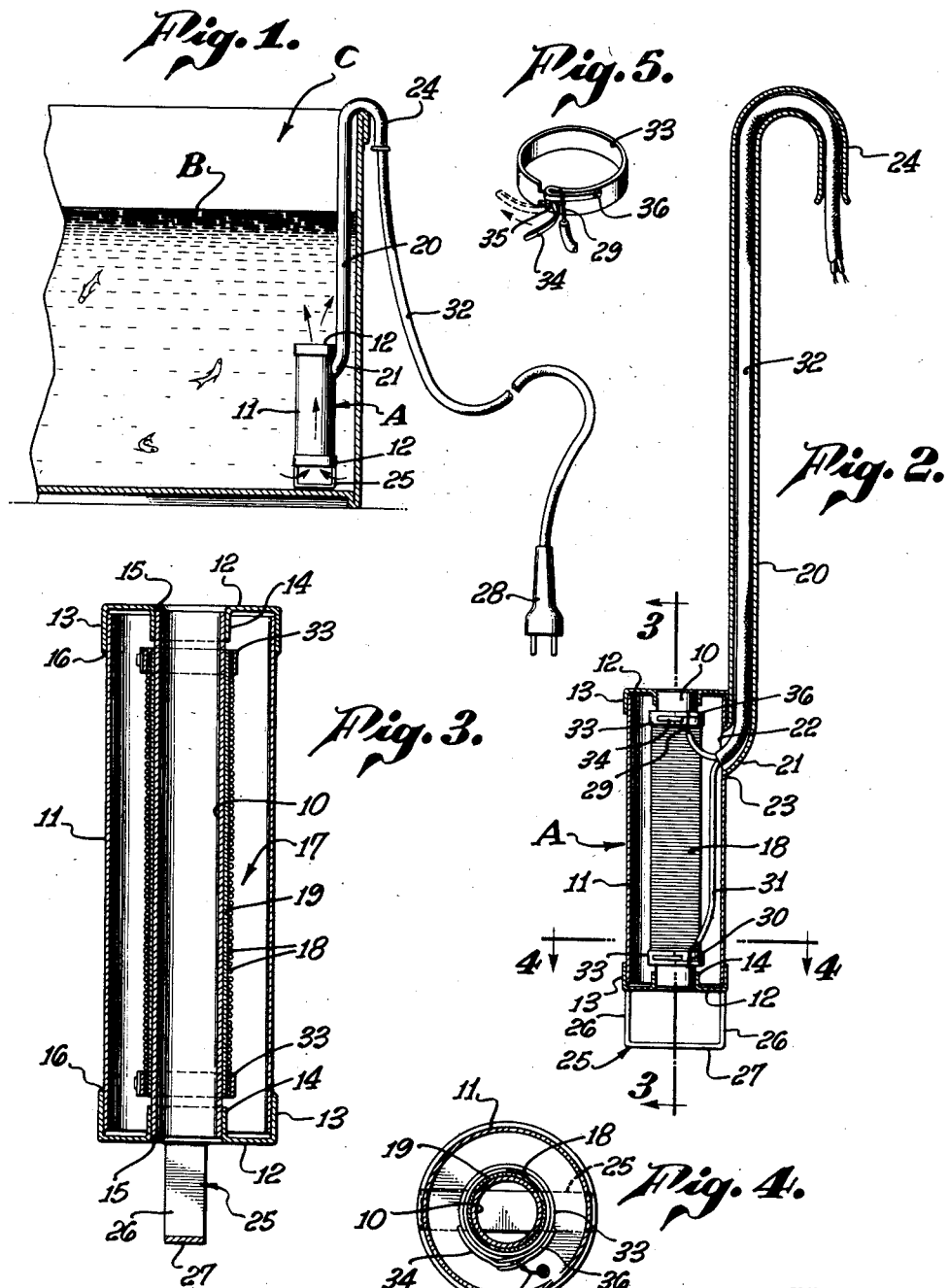
June 20, 1950 — E. M. CABRERA — 2,511,902
AQUARIUM ELECTRICAL HEATER
Filed Jan. 25, 1949
INVENTOR.
EDWARD M. CABRERA,
BY John Flann
ATTORNEY.

2,511,902

UNITED STATES PATENT OFFICE 2,511,902

AQUARIUM ELECTRICAL HEATER

Edward M. Cabrera, Los Angeles, Calif.

Application January 25, 1949, Serial No. 72,650

1 Claim. (Cl. 219—41)

1

The present invention relates to electrical aquarium heaters, and more particularly to heating devices adapted to be submerged in a liquid, such as water, for the purpose of heating the same.

This invention is a continuation-in-part of my application for "Aquarium electric heater," Serial No. 17,653, filed March 29, 1948, now abandoned.

An object of the invention is to provide a submersible electrical heater capable of effectively heating water, or other liquid, without danger of shock to persons or to other animal life, such as fish in the water being heated.

A further object of the invention is to provide a submersible electrical device for heating liquids, in which the heating effect is confined to the interior of the device, and in which heating of external surfaces of the heater is largely minimized to prevent potentially harmful effects on live fish and/or other forms of marine life in the liquid containing the heater.

Still another object of the invention is to provide a submersible heater capable of being readily located at the lower portion of an aquarium to insure proper heating of the water mass in the aquarium.

Yet a further object of the invention is to provide an improved manner of attaching electrical lead wires to the terminals of a resistance heater.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claim.

Referring to the drawings:

Figure 1 is a partial vertical section through an aquarium, disclosing an electrical heater submerged in the water within the aquarium;

Fig. 2 is a vertical section through the electrical heater, shown in elevation in Fig. 1;

Fig. 3 is an enlarged vertical section through the heater, taken along the line 3—3 on Fig. 2;

Fig. 4 is an enlarged cross-section taken along the line 4—4 on Fig. 2; and

Fig. 5 is a perspective view of a terminal band used in the heater.

As disclosed in the drawings, the heater A is adapted to warm a mass of water B contained within an aquarium C, in which fish and/or other forms of marine life may be disposed. Of course, the heater can be used generally for heating other liquids confined within other types of vessels, although it is particularly adapted for aquarium use for reasons pointed out hereinbelow.

The heating device A includes an inner cylindrical metallic tube 10 and a concentric outer cylindrical metallic tube or casing 11 spaced therefrom by a substantial transverse distance. The tubes are held in spaced relation by upper and lower oppositely facing annular closure members 12. Each closure member has an outer skirt 13 surrounding the end of the outer casing 11 and an inner skirt 14 disposed around the inner metallic tube 10. Leakage between the closure members 12 and the inner and outer tubes 10, 11 may be prevented in any suitable manner, as by depositing solder 15 circumferentially around the joint between each end of the inner tube 10 and the closure member 12, and by depositing solder 16 around the joint formed by the end of the outer skirt 13 and the periphery of the outer casing 11. In this manner, a leakproof, elongate annular chamber 17 is formed between the inner and outer casing 10, 11, in which dead air is entrapped.

It is desired to heat the inner metallic tube 10, but it is preferred to minimize heating of the outer casing 11. The heating of the inner metallic tube is obtained by passing an electric current through a high resistance wire 18, which is wound in helical fashion around the inner tube 10. The resistance wire is preferably coiled upon an insulation tube 19, which may be formed of mica, disposed in close contact with the exterior of the inner metallic tube. The tubular mica member will prevent current from passing to the inner metallic tube, but it will readily conduct heat from the resistance wire 18 to the inner metallic tube 10.

Because of the substantial spacing of the resistance wire 18 from the outer tube or casing 11, and because of the high insulation properties of the dead air confined in the annular chamber 17, substantially all of the heat developed in the resistance coil will be transmitted by conduction to the inner metallic tube 10. Only a small amount of heat will be conducted or radiated to the outer tube or casing 11. This is highly desirable for several reasons, to be pointed out below.

The heater A may be suspended in the aquarium C, preferably at the lower portion of the body of water B therein, to insure more efficient heating of the water mass. To accomplish this purpose, a metallic tubular handle 20 extends upwardly from the outer casing 11, its lower end 21 being turned or bent for reception within an aperture 22 formed in the outer casing. The handle 20 is firmly attached to the outer tubular member 11 by depositing solder 23, or the like, on the exterior of the inturned handle portion 21 and at the adjacent surfaces on the outer casing, this solder sealing the clearance space between the handle and casing and preventing leakage of water into the chamber 17.

The upper end 24 of the handle is curved in inverted U-shape fashion to enable the entire heater to be suspended from the upper edge of the aquarium C, and with the main body of the heater disposed preferably in the lower portion of the water mass B (see Fig. 1). In the event that the heater is to be supported from the bottom of the aquarium, a support 25 may be attached to the lower closure member 12. As shown in the drawings, this support 25 may be of generally U-shape with its legs 26 extending upwardly from the horizontal base portion 27, the upper ends of the legs being attached, as by soldering, to the lower closure member 12. When the base 27 of the support rests upon the bottom of the aquarium C, water may circulate freely through the inner tubular member 10.

Current from a suitable socket (not shown) is fed to the resistance element 18 of the heater through the usual electrical plug 28, which is connected to a pair of lead wires 29, 30 having the usual insulation covering 31 and disposed within an outer insulation covering 32 to form an electrical cord unit. The wires 29, 30 pass through the tubular handle 20 to the interior of the annular chamber 17, where one wire 29 is connected to the upper end of the resistance element 18 and the other wire 30 is connected to the lower end of the resistance element.

As shown in the drawings, the connections between the lead wires 29, 30 and the resistance element 18 each include a conductive terminal band 33 disposed around the end turns of the resistance wire. The terminal band is placed around such end turns and is clamped securely thereto. This clamping action is obtained by threading a central clip 34, integral with and extending from one end of the terminal band 33, through a hole or aperture 35 in the other end of the terminal band, and then bending the clip back upon the end of the band from which it projects, as clearly shown in Fig. 5. In addition, the terminal band 33 has a second side clip or tongue 36 extending from the end containing the aperture 35, which may be bent back upon itself, as shown in Fig. 5, to form a binding post for one of the lead wires, securely clamping this wire against the main portion of the terminal band. A good electrical connection between each lead wire 29 or 30, binding post 36 and terminal band 33 is obtained by bending the tongue 36 against the band 33, thus crimping the end of wire 29 in place to make a solid connection. However, silver, or other high melting point, solder, may be used if desired, but this is not essential.

When the device A is placed in the aquarium C, the inner metallic tube 10 is heated by current passing through the high resistance wire 18. A natural water circulation is obtained, since the cooler water at the bottom of the aquarium enters the heater at the lower end of the inner tube 10, and, upon being heated therewithin, rises and discharges from its upper end. In view of the current set up by the circulation of the water through the heater, fish and other marine life in the aquarium are not disposed to enter the inner tubular member 10. As a consequence, they do not come in contact with the heated surface of this member 10. The insulation effect of the dead air entrapped between the inner and outer members 10, 11 insures that the outer casing member 11 will remain comparatively cool; so that marine life coming in contact with this outer casing are not harmed.

The heating unit is very efficient, especially when applied to aquariums, since it dispenses substantially all of its heat at the bottom of the vessel. The cylindrical construction of the heater produces a certain quantity of air bubbles during upward circulation of the water through the inner tube 10, which releases oxygen in the water B, which is beneficial to the marine life in the aquarium, and particularly to tropical fish.

The substantially all-metal construction of the submersible heater A insures against its breakage, and avoids any possibility of contact of the electrical conducting elements with the water, and directly or indirectly with marine or other life, thereby avoiding hazards of electrocution.

The inventor claims:

In an immersion heater: a metallic tube; an electrical heating element disposed thereon; an outer metallic tube concentric with the inner tube and spaced substantially from the inner tube; means sealing the ends of the annular space between the tubes; the ends of the inner tube being open to facilitate circulation of the liquid being heated through the inner tube; a support carried by one end of the structure for resting the heater on the bottom of a container without obstructing the ingress of the liquid into the lower end of the inner tube; and a metal sheath for the lead-in conductors for the element and joined in fluid-tight manner to the outer tube at a place near that end which is opposite the support, and extending upwardly and close to the axis of the tube.

EDWARD M. CABRERA.

REFERENCES CITED

The following references are of record in the file of this patent:

UNITED STATES PATENTS

| Number | Name | Date |
|---|---|---|
| 976,405 | Shoenberg | Nov. 22, 1910 |
| 1,004,165 | Hanscom et al. | Sept. 26, 1911 |
| 1,222,669 | Purnell | Apr. 17, 1917 |
| 1,445,919 | Stone | Feb. 20, 1923 |
| 1,508,199 | Thornton, Jr. | Sept. 9, 1924 |
| 1,796,199 | Gill | Mar. 10, 1931 |
| 1,932,923 | Bullinger | Oct. 31, 1933 |
| 1,970,051 | McWeeny | Aug. 14, 1934 |
| 2,146,402 | Morgan | Feb. 7, 1939 |
| 2,429,303 | Apatow | Oct. 21, 1947 |